United States Patent
Rathbun et al.

(10) Patent No.: US 7,347,381 B2
(45) Date of Patent: *Mar. 25, 2008

(54) SECURE RADIO FREQUENCY IDENTIFICATION DOCUMENTS

(75) Inventors: Darryl T. Rathbun, Stratford, CT (US); Thomas J. Foth, Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 495 days.

This patent is subject to a terminal disclaimer.

(21) Appl. No.: 11/014,029

(22) Filed: Dec. 16, 2004

(65) Prior Publication Data

US 2006/0145858 A1    Jul. 6, 2006

(51) Int. Cl.
*G06K 7/10* (2006.01)
(52) U.S. Cl. .................................. 235/492; 235/487
(58) Field of Classification Search ................ 235/375, 235/462.46, 487, 492
See application file for complete search history.

(56) References Cited

U.S. PATENT DOCUMENTS

| | | | |
|---|---|---|---|
| 4,889,961 A * | 12/1989 | Carlson | 174/261 |
| 5,962,834 A | 10/1999 | Markman | |
| 6,018,299 A * | 1/2000 | Eberhardt | 340/572.7 |
| 6,111,506 A * | 8/2000 | Yap et al. | 340/572.1 |
| 6,436,516 B1 * | 8/2002 | Nagashima et al. | 428/201 |
| 6,480,100 B1 | 11/2002 | Frieden et al. | |
| 6,557,768 B2 | 5/2003 | Yap et al. | |
| 6,628,199 B1 * | 9/2003 | Ehrensvard et al. | 340/568.1 |
| 2001/0006194 A1 | 7/2001 | Kayanakis et al. | |

FOREIGN PATENT DOCUMENTS

| | | |
|---|---|---|
| DE | 19947180 A1 | 4/2001 |
| DE | 20106542 U1 | 6/2001 |
| DE | 10016716 A1 | 8/2001 |
| JP | 0223037522 A | 2/2003 |
| WO | WO 01/91045 A1 | 11/2001 |

* cited by examiner

*Primary Examiner*—Daniel Stcyr
(74) *Attorney, Agent, or Firm*—Ronald Reichman; Angelo N. Chaclas

(57) ABSTRACT

A method for the secure reading of answers to questions or quires by an RFID reader that were made by marking answers with a pencil or ballpoint pen on a material. The questions are securely transmitted because an identification on the material indicates the order of the transmitted questions or from which electrical contacts the answers correspond to.

26 Claims, 10 Drawing Sheets

SECURE RADIO FREQUENCY IDENTIFICATION DOCUMENTS

CROSS REFERENCE TO RELATED APPLICATIONS

Reference is made to commonly assigned co-pending patent application Ser. No. 10/430,922 filed May 7, 2003, entitled "METHOD FOR FIELD PROGRAMMABLE RADIO FREQUENCY IDENTIFICATION DEVICES TO PERFORM SWITCHING FUNCTIONS" in the names of Thomas J. Foth, Brian M. Romansky, Andrei Obrea, Jeffrey D. Pierce, and Anand V. Chhatpar; and U.S. Pat. No. 6,869,020 B2 filed May 7, 2003, entitled "METHOD FOR FIELD PROGRAMMABLE RADIO FREQUENCY IDENTIFICATION TESTING DEVICES FOR TRANSMITTING USER SELECTED DATA" in the names of Thomas J. Foth, Brian M. Romansky, Jeffrey D. Pierce, Andrei Obrea.

FIELD OF THE INVENTION

This invention relates to electronic circuits and, more particularly, to the accurate and secure reading of answers to questions or quires that were made by connecting electronic circuits with a pencil or ballpoint pen.

BACKGROUND OF THE INVENTION

From the invention of paper thousands of years ago to the present date, paper has been used as the preferred medium by individuals and societies for the recording, processing and storage of information. With the introduction of computers into society, many of the functions previously performed exclusively with paper are now being accomplished by writing information on paper and entering the written information into a computer. Typically, the information written on paper is entered into computers by optically scanning the paper. Often the paper is contained in an envelope that has to be opened before the envelope is scanned. Thus, the foregoing method of entering information into computers is inconvenient and time consuming.

Another method utilized by the prior art for entering information that was contained in an envelope into a computer, without opening the envelope involved the use of radio frequency identification (RFID) tags. The RFID tags were programmed to contain digital information either during the manufacturing of the read only memory portion of the RFID integrated circuit, or in the field using electromagnetic radio frequency signals to store information in the nonvolatile memory portion of the RFID tag. A RFID tag does not require contact or line-of-sight to operate. RFID tags can function under a variety of environmental conditions, and provides a high level of data integrity. RFID tags utilize radio frequency signals to transfer information from the RFID tag to a RFID reader. Thus, radio waves are used to transfer information between the RFID tag and the RFID reader. A disadvantage of the foregoing is that the information transmitted by the RFID tag may be incorrect.

Another disadvantage of the foregoing was that an unauthorized observer might read the transmitted information.

SUMMARY OF THE INVENTION

This invention overcomes the disadvantages of the prior art by providing a method that allows the accurate and secure reading of answers to questions or queries by an RFID reader that were made by marking answers with a pencil or ball point pen on a material. The material may be any cellulose type product, i.e., paper, cardboard, chipboard, wood or plastic, fabric, animal hide, etc. The marked entered information may be corrected by erasing the written information with an eraser and writing new information on the paper with a pencil or ballpoint pen.

DETAILED DESCRIPTION OF THE PREFERRED EMBODIMENT

Figure 1:
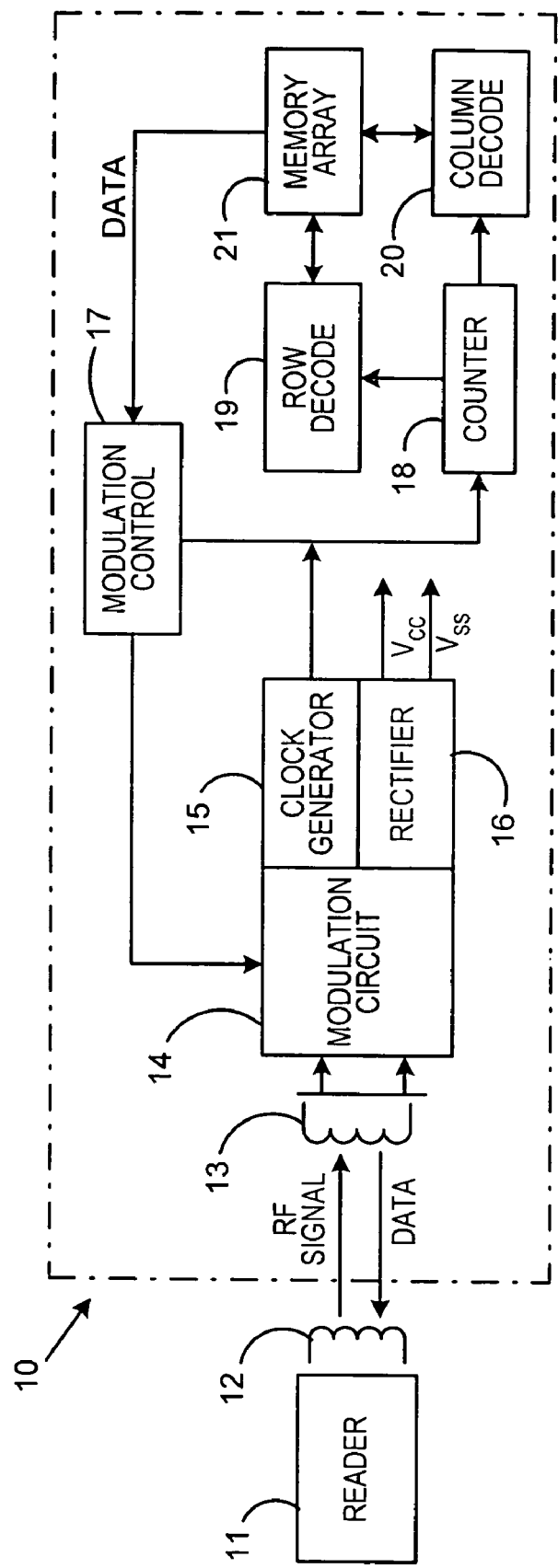
FIG. 1 is a block diagram of a prior art RFID circuit.

Referring now to the drawings in detail, and more particularly to FIG. 1, the reference character 10 represents a prior art RFID circuit. Circuit 10 may be the model MCRF 200 manufactured by Microchip Technology, Inc. of 2355 West Chandler Blvd, Chandler, Ariz. 85224. RFID reader 11 is connected to coil 12, and 12 is coupled to coil 13. Coil 13 is connected to modulation circuit 14. Modulation circuit 14 is connected to clock generator 15 and rectifier 16. Modulation control 17 is coupled to modulation circuit 14, clock generator 15 and counter 18. Counter 18 is coupled to column decode 20. Row decode 19 is coupled to memory array 21, and array 21 is coupled to modulation control 17. It would be obvious to one skilled in the art that a battery may be used to supply power to circuit 10.

Reader 11 has a transmitter mode and a receiver mode. During the transmit mode of reader 11, reader 11 transmits a radio frequency signal for a burst of time via coil 12. After the transmission of a signal by reader 11, reader 11 turns into a receiver. Coil 12 is inductively linked with coil 13, and coil 13 receives the radio frequency signal from coil 12 and converts the aforementioned signal into inductive energy, i.e., electricity. When coil 13 has sufficient energy, coil 13 will cause clock generator 15 to generate timing pulses which drive counter 18. Counter 18 drives row decode 19 which causes memory array 21 to read the fixed bit data pattern stored in memory array 21 one bit at a time. As the data bits are being read by array 21, the data bits are transmitted to modulation control circuit 17. Control circuit 17 sends the data bits to reader 11 via modulation circuit 14 and coils 13 and 12.

Figure 2A:
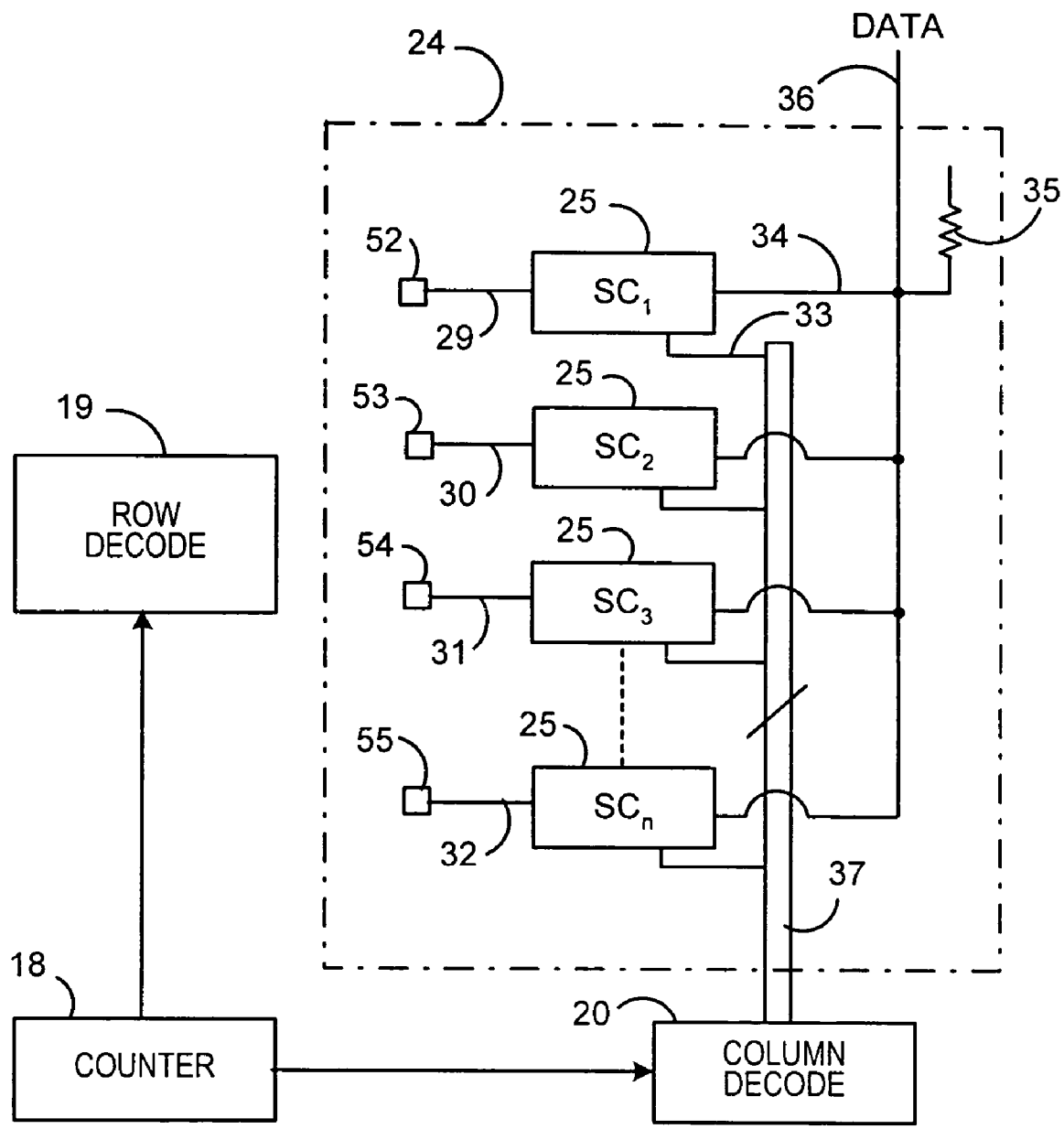
FIG. 2A is a drawing of a circuit 24 that replaces memory array 21 of FIG. 1 showing how programming of the bits may be accomplished by making the bits externally available for programming RFID circuit 10.

FIG. 2A is a drawing of a circuit 24 that replaces memory array 21 of FIG. 1 showing how programming of the bits may be accomplished by making the bits externally available for programming RFID circuit 10. A plurality of sensor circuits 25 is contained in circuit 24. Sensor circuits 25 are labeled $SC_1$ $SC_2$ $SC_3$ ... $SC_n$. Line 29 is connected to $SC_1$ and graphite contact 52 and line 30 is connected to $SC_2$ and graphite contact 53. Line 31 is connected to $SC_3$ and graphite contact 54 and line 32 are connected to $SC_n$ and graphite contact 55. There is a sensor circuit 25 for each graphite contact. The description of FIG. 4 will describe how information may be entered into circuit 24 via graphite contacts 52-55. $SC_1$ has an input 33, which enables the data output 34. Input 33 is connected to one of the n lines 37, and data output 34 is connected to data line 36 and pull up resistor 35. Data line 36 is connected to modulation control 17 (FIG. 1).

When counter 18 selects the value 1, column decode 20 will enable line 33, which will cause the same logic level that is on graphite contact 52 to be placed on data output 34. When line 33 is not selected, the value on graphite contact 52 does not have any influence on the data output line 34. Enable outputs 33 for $SC_1$ ... $SC_n$ are bundled together in lines 37 so that only one line 37 is turned on at a time. Lines 37 are connected to column decode 20. Column decode 20 is connected to counter 18, and counter 18 is connected to row decode 19. Counter 18 generates a sequence of numbers from 1 through n to enable a different line 37 in sequential order. Thus, data line 36 will receive the data outputs 34 from $SC_1$ ... $SC_n$ at different times.

Figure 2B:
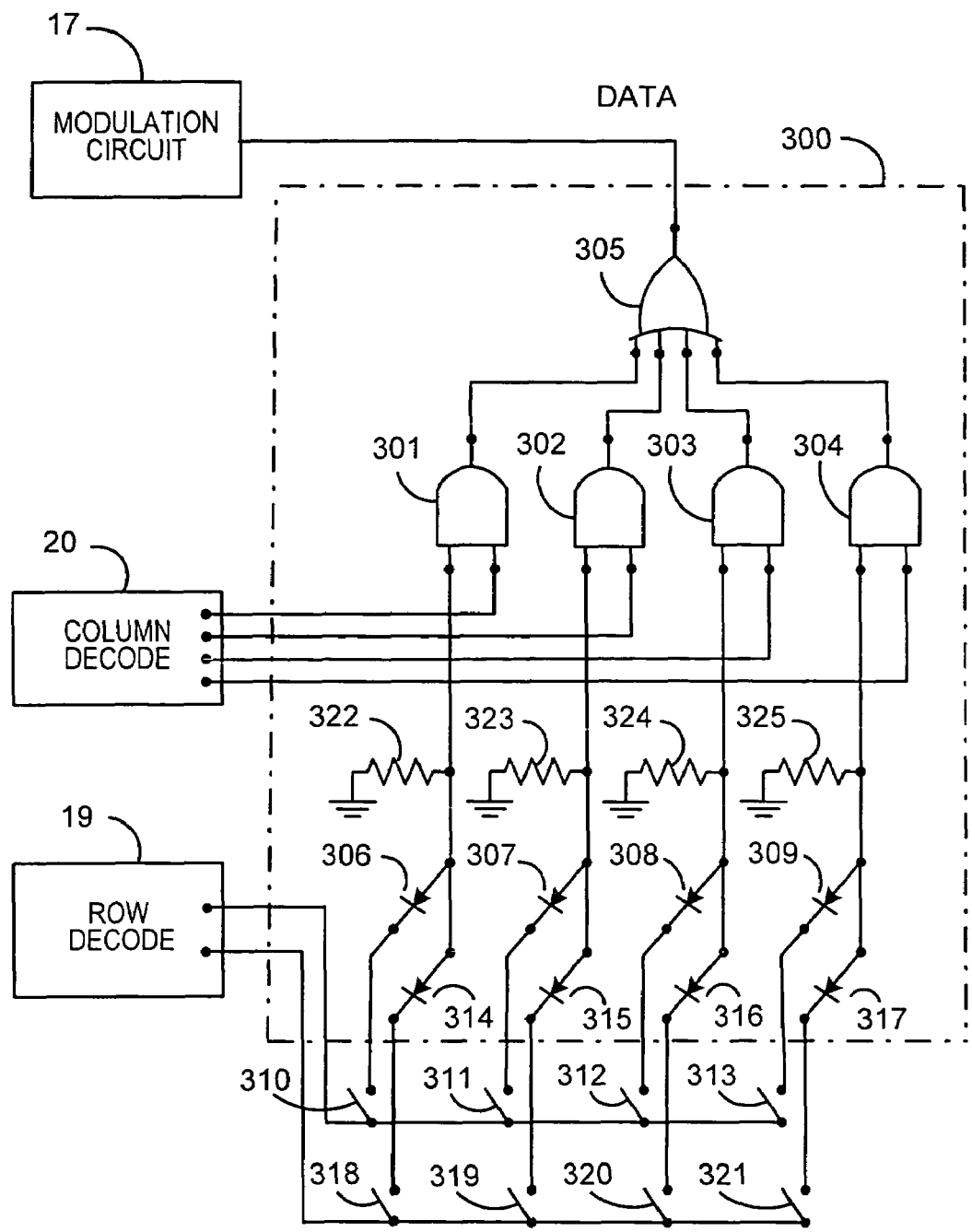
FIG. 2B is a drawing of a circuit 300 that is an alternate representation of circuit 24, that replaces memory array 21 of FIG. 1 showing how programming of the bits may be accomplished by making the bits externally available for programming RFID circuit 10.

FIG. 2B is a drawing of a circuit 300 that is an alternate representation of circuit 24, that replaces memory array 21 of FIG. 1 showing how programming of the bits may be accomplished by making the bits externally available for programming RFID circuit 10. Circuit 300 includes AND gates 301, 302, 303 and 304 and OR gate 305.

One of the inputs of AND gate 301 is connected to column decode 20 and the other input to AND gate 301 is connected to one of the ends of resistor 322, one of the ends of diode 306 and one of the ends of diode 314. The other end of resistor 322 is connected to ground. The other end of diode 306 is connected to one of the terminals of toggle switch 310, and the other end of toggle switch 310 is connected to row decode 19. The other end of diode 314 is connected to one of the terminals of toggle switch 318, and the other end of toggle switch 318 is connected to row decode 19.

One of the inputs of AND gate 302 is connected to column decode 20, and the other input to AND gate 302 is connected to one of the ends of resistor 323, one of the ends of diode 307 and one of the ends of diode 315. The other end of resistor 323 is connected to ground. The other end of diode 307 is connected to one of the terminals of toggle switch 311, and the other end of toggle switch 311 is connected to row decode 19. The other end of diode 315 is connected to one of the terminals of toggle switch 319, and the other end of toggle switch 319 is connected to row decode 19.

One of the inputs of AND gate 303 is connected to column decode 20, and the other input to AND gate 303 is connected to one of the ends of resistor 324, one of the ends of diode 308 and one of the ends of diode 316. The other end of resistor 324 is connected to ground. The other end of diode 308 is connected to one of the terminals of toggle switch 312, and the other end of toggle switch 312 is connected to row decode 19. The other end of diode 316 is connected to one of the terminals of toggle switch 320, and the other end of toggle switch 320 is connected to row decode 19.

One of the inputs of AND gate 304 is connected to column decode 20, and the other input to AND gate 304 is connected to one of the ends of resistor 325, one of the ends of diode 309 and one of the ends of diode 317. The other end of resistor 325 is connected to ground. The other end of diode 309 is connected to one of the terminals of toggle switch 313, and the other end of toggle switch 312 is connected to row decode 19. The other end of diode 317 is connected to one of the terminals of toggle switch 321, and the other end of toggle switch 321 is connected to row decode 19.

Column decode 20 and row decode 19 function by taking the selected output at logic one, i.e., a high level and keeping all the other outputs at logic zero, i.e., a low level. The output of AND gates 301-304 are connected to the input of OR gate 305, and the output of OR gate 305 is data that is connected to the input of modulation circuit 17. If switches 310, 311, 312 and 313, respectively, remain open, AND gates 301-304, respectively, will have a "zero" output. If switches 310, 311, 312 and 313, respectively, are closed, AND gates 301-304, respectively, will have a "one" output. The output of AND gates 301-304, respectively, will be read when switches 318-321, respectively, are closed.

Figure 3:
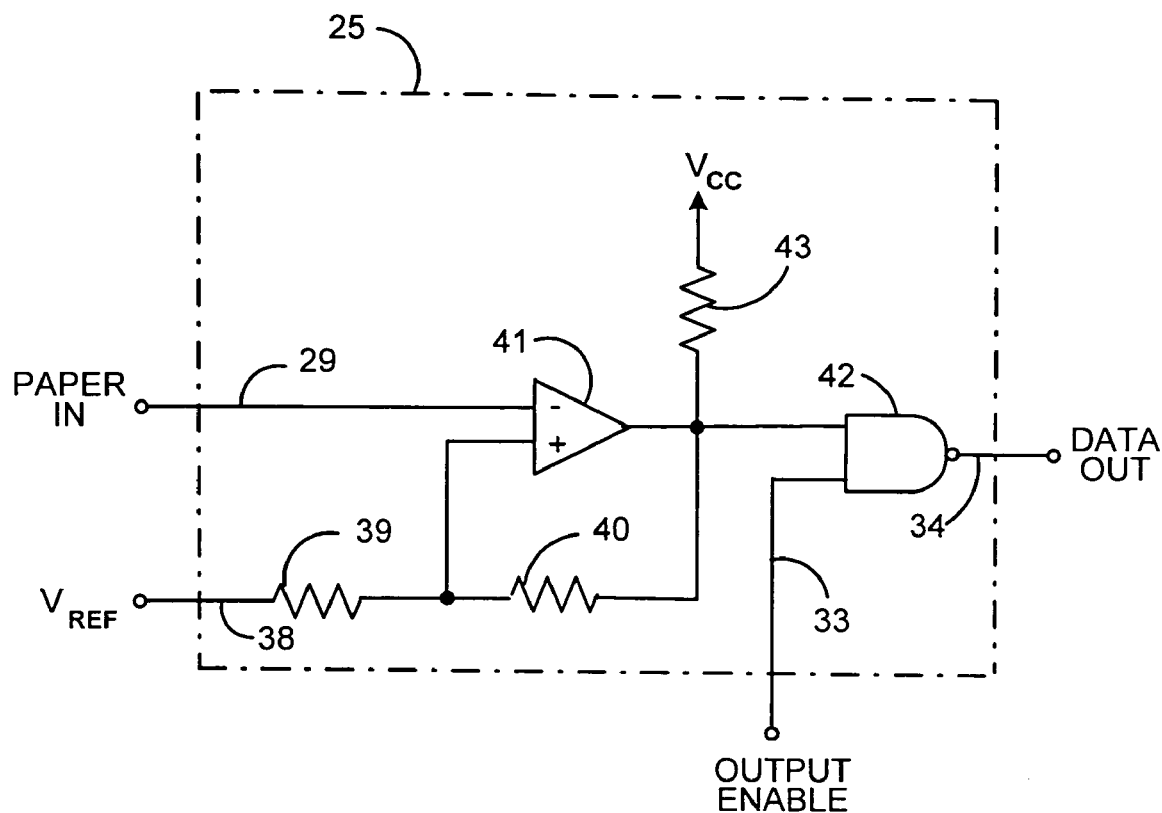
FIG. 3 is a drawing showing sensor circuit 25 of FIG. 2A in greater detail.

FIG. 3 is a drawing showing sensor circuit 25 of FIG. 2A in greater detail. The negative input of comparator 41 is connected to line 29, and the positive input of comparator 41 is connected to line 38. Comparator 41 may be a LM339N comparator. One end of line 38 is connected to a 2-3 volt reference voltage, and the other end of line 38 is connected to one of the ends of resistor 39. The other end of resistor 39 is connected to the positive input of comparator 41 and one of the ends of resistor 40. The other end of resistor 40 is connected to the input of NAND gate 42, the output of comparator 41 and one of the ends of resistor 43. The other end of resistor 43 is connected to a source voltage to act as a pull up resistor. The other input to NAND gate 42 is enable output 33. The output of gate 42 is data output 34. Resistor 39 may be 47,000 ohms, and resistor 40 may be 470,000 ohms. Resistor 43 may be 1,000 ohms. Comparator 41 has a positive feedback to provide a small amount of hysteresis Sensor circuit 25 is a differential circuit that accommodates variations in the conductivity of the conductive material. The conductive material may be used as a voltage divider to produce $V_{ref}$ on line 38 under the same conditions experienced by $paper_{in}$ on line 29. Thereby, nullifying the effects of varying resistance in the conductive material. It will be obvious to one skilled in the art that sensor circuit 25 may replace switches 310-313 and 318-321 of FIG. 2B.

Figure 4:
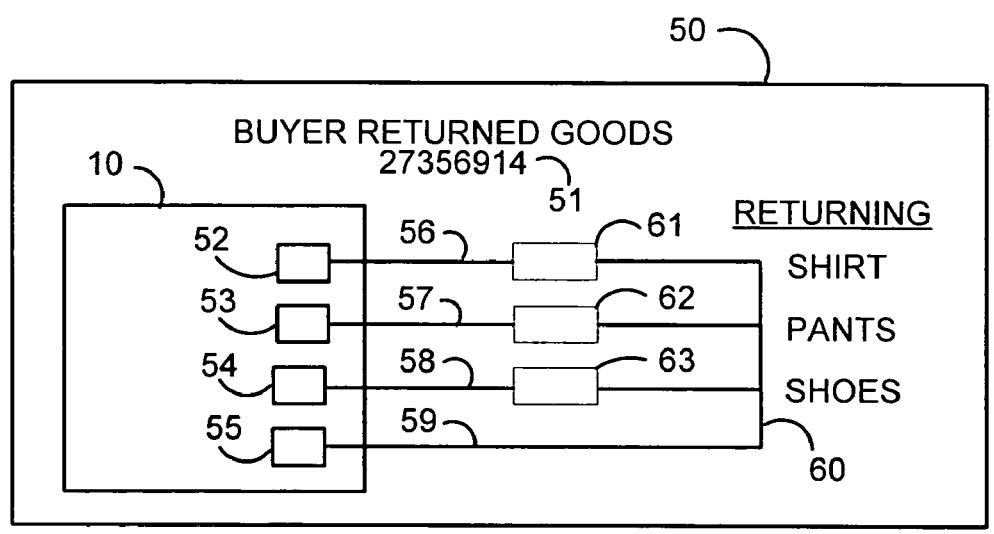
FIG. 4 is a seller furnished form to be completed by a buyer returning goods to a seller.

FIG. 4 is a seller-furnished form to be completed by a buyer returning goods to a seller. RFID circuit 10 is attached to paper 50 by means of a conductive adhesive such as an anisotropic adhesive (not shown). The seller places a returned goods identification number 51 on the form to identify the buyer by writing the invoice number for the purchased goods on paper 50 in a manner that number 51 may be read by a RFID reader. Graphite contacts 52, 53, 54 and 55 and lines 56, 57, 58, 59 and 60 are printed on standard bond paper, standard photocopier paper, standard computer paper, etc., by a standard computer printer like the model Desk Jet 880C printer manufactured by Hewlett Packard using a Hewlett Packard 45 black ink cartridge. Rectangles 61-63 are printed by a standard computer printer like the DeskJet 880C printer manufactured by Hewlett Packard using a Hewlett Packard 78 tri-color cartridge and any combination of the cyan, magenta, and yellow inks.

If the buyer decides to return a shirt to the seller, the buyer uses a graphite pencil, i.e., number 2, HB, etc., or a Paper Mate® black ballpoint pen to fill in rectangle 61. If the buyer decides to return pants to the seller, the buyer fills in rectangle 62 with a graphite pencil, and if the buyer decides to return shoes to the seller, the buyer fills in rectangle 63 with a graphite pencil. If the buyer changes his/her mind regarding the goods to be returned or makes a mistake in filling in one of the rectangles, the buyer could erase the penciled marking in the rectangle with a pencil eraser so that a RFID reader would only read what the buyer indicated on the finished form. The buyer would insert the finished form into a package (not shown) containing the returned goods, and the seller would be able to read the completed form when he/she receives the package with a RFID read without opening the package.

Figure 5:
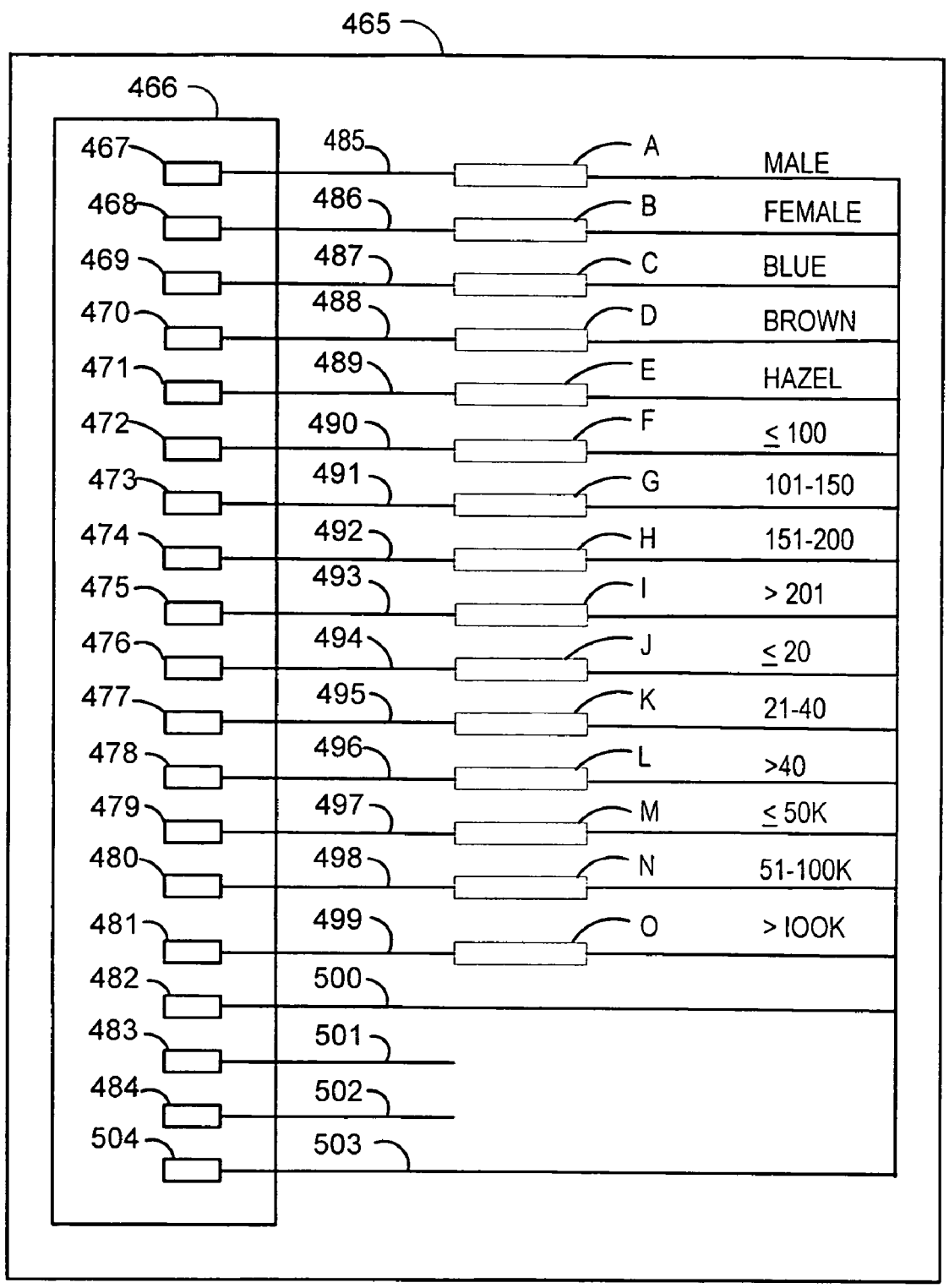
FIG. 5 is a drawing showing how a modified RFID circuit may be attached to a piece of paper in order to permit a user to answer various types of questions.

FIG. 5 is a drawing showing how a modified RFID circuit may be attached to a piece of paper in order to permit a user to answer various types of questions. RFID circuit 466 is attached to paper 465 by means of an adhesive (not shown). RFID circuit 466 is the same as RFID circuit 10 with circuit 24 replacing memory array 21 of FIG. 1 with different graphite contacts. Graphite contacts: 467-484 and 504, lines 485-503 are printed on paper 465 by a standard computer printer like the model Desk Jet 880C printer manufactured by Hewlett Packard using a Hewlett Packard 45 black ink cartridge. Rectangles A through O are printed by a standard computer printer like the DeskJet 880C printer manufactured by Hewlett Packard using a Hewlett Packard 78 tri-color cartridge and any combination of the cyan, magenta, and yellow inks.

Rectangle "A" appears on line 485, which is connected to contact 467 and rectangle "B" appears on line 486, which is connected to contact 468. Rectangle "C" appears on line 487, which is connected to contact 469 and rectangle "D" appears on line 488, which is connected to contact 470. Rectangle "E" appears on line 489, which is connected to contact 471 and rectangle F is connected to line 490 which is connected to contact 472. Rectangle "G" appears on line 491, which is connected to contact 473 and rectangle "H" appears on line 492, which is connected to contact 474. Rectangle "I" appears on line 493, which is connected to contact 475 and rectangle "J" appears on line 494, which is connected to contact 476. Rectangle "K" appears on line 495, which is connected to contact 477 and rectangle "L" is connected to line 496 which is connected to contact 478. Rectangle "M" appears on line 497, which is connected to contact 479 and rectangle "N" appears on line 498, which is connected to contact 480. Rectangle "O" appears on line 499, which is connected to contact 481. Line 500 is connected to contact 482 and line 501 is connected to contact 483. Line 502 is connected to contact 484. Lines 500, 501 and 502 will indicate the order of the questions listed on paper 465. For instance, line 500 may represent $2^0$ and line 501 represents $2^1$. Line 502 would represent $2^2$. Thus, line 500 is printed by a standard computer printer to connect to line 503, the questions listed in paper 465 are in the order shown in FIG. 5 and may be identified as identification number 1. It would be obvious to one skilled in the art, that letters or alphanumeric characters, etc may also represent the identification number. Line 503 is connected to contact 504.

If the user is a male, the user uses a graphite pencil, i.e., number 2, HB, etc., or a Paper Mate® black ballpoint pen to fill in rectangle "A". If the user has blue eyes and weighs 160 pounds, the user, the user uses a graphite pencil, i.e., number 2, HB, etc., or a Paper Mate® black ball point pen to fill in rectangles "C" and "H". If the user is forty-two years old and earns over $100,000 a year the user uses a graphite pencil, i.e., number 2, HB, etc., or a Paper Mate® black ball point pen to fill in rectangles "L" and "O". If the user changes his/her mind regarding the answer to one of the questions or makes a mistake in filling in one of the rectangles, the user could erase the penciled marking in the rectangle with a eraser so that a RFID reader would only read what the user indicated last.

Figure 6:
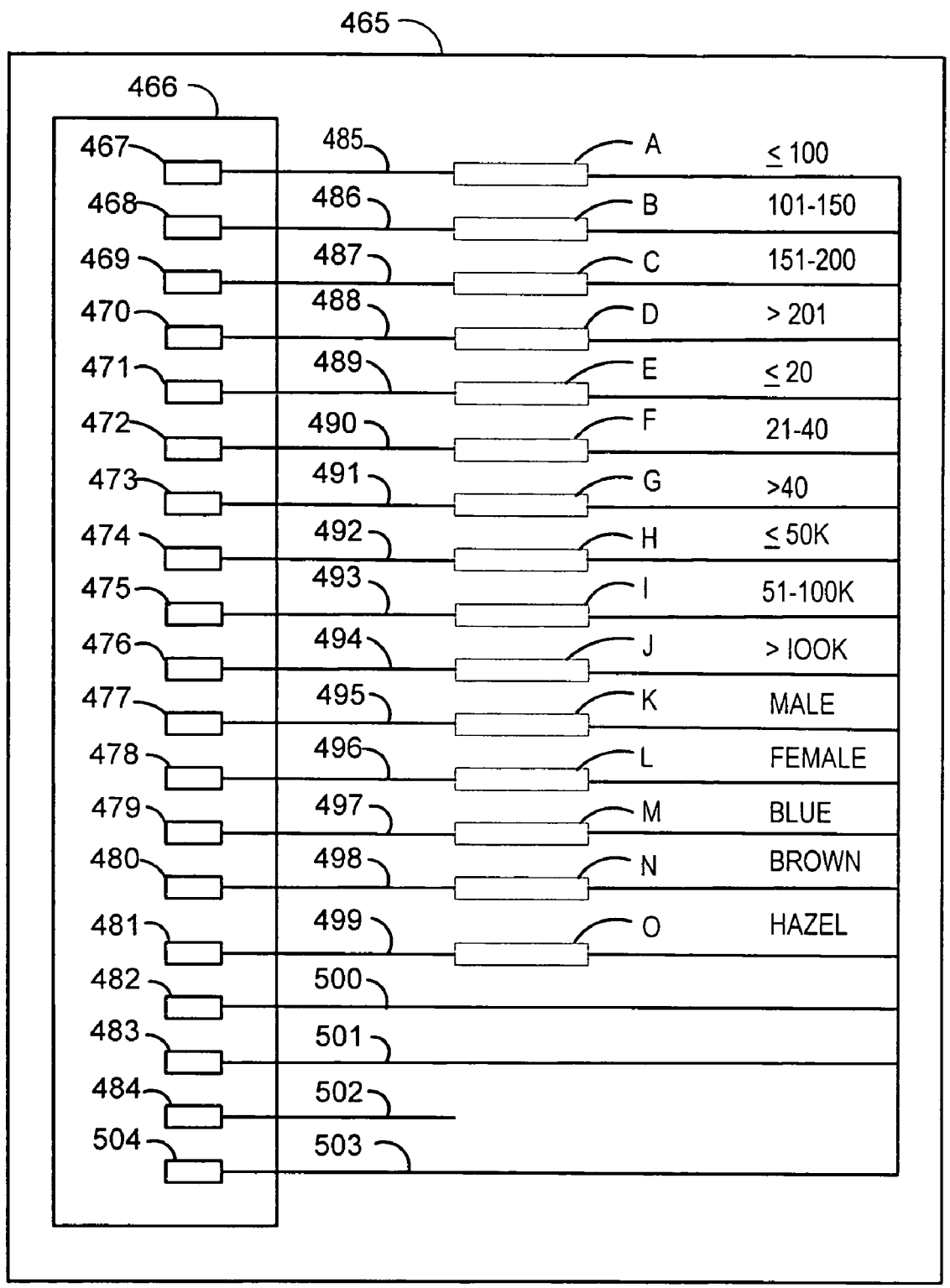
FIG. 6 is a drawing modifying the circuit of FIG. 5 to permits a user to answer the various questions posed in FIG. 5 in a different order.

FIG. 6 is a drawing modifying the circuit of FIG. 5 to permits a user to answer the various questions posed in FIG. 5 in a different order. Lines 500, 501 and 502 will indicate the identification of the questions listed on paper 465. For instance, line 500 may represent $2^0$ and line 501 represents $2^1$. Line 502 would represent $2^2$. Lines 500 and 501 are printed with a standard computer printer. Line 500 is connected to line 503 and line 501 is connected to line 503. Hence, the questions listed in paper 465 are in the order indicated by identification 3. Thus, when a RFID reader read the answers that the user indicated by using a graphite pencil or ballpoint pen to fill in one or more rectangles A-O, the answers to the questions would depend on their order.

If the user is a male, the user uses a graphite pencil, i.e., number 2, HB, etc., or a Paper Mate® black ballpoint pen to fill in rectangle "K". If the user has blue eyes and weighs 160 pounds, the user, the user uses a graphite pencil, i.e., number 2, HB, etc., or a Paper Mate® black ball point pen to fill in rectangles "M" and "C". If the user is forty-two years old and earns over $100,000 a year the user uses a graphite pencil, i.e., number 2, HB, etc., or a Paper Mate® black ball point pen to fill in rectangles "G" and "J". Thus, if someone is receiving to the answers to the questions being transmitted to the RFID reader they would be unable to ascertain what the answers to the questions are since the answers may be transmitted in many different orders.

Figure 7:
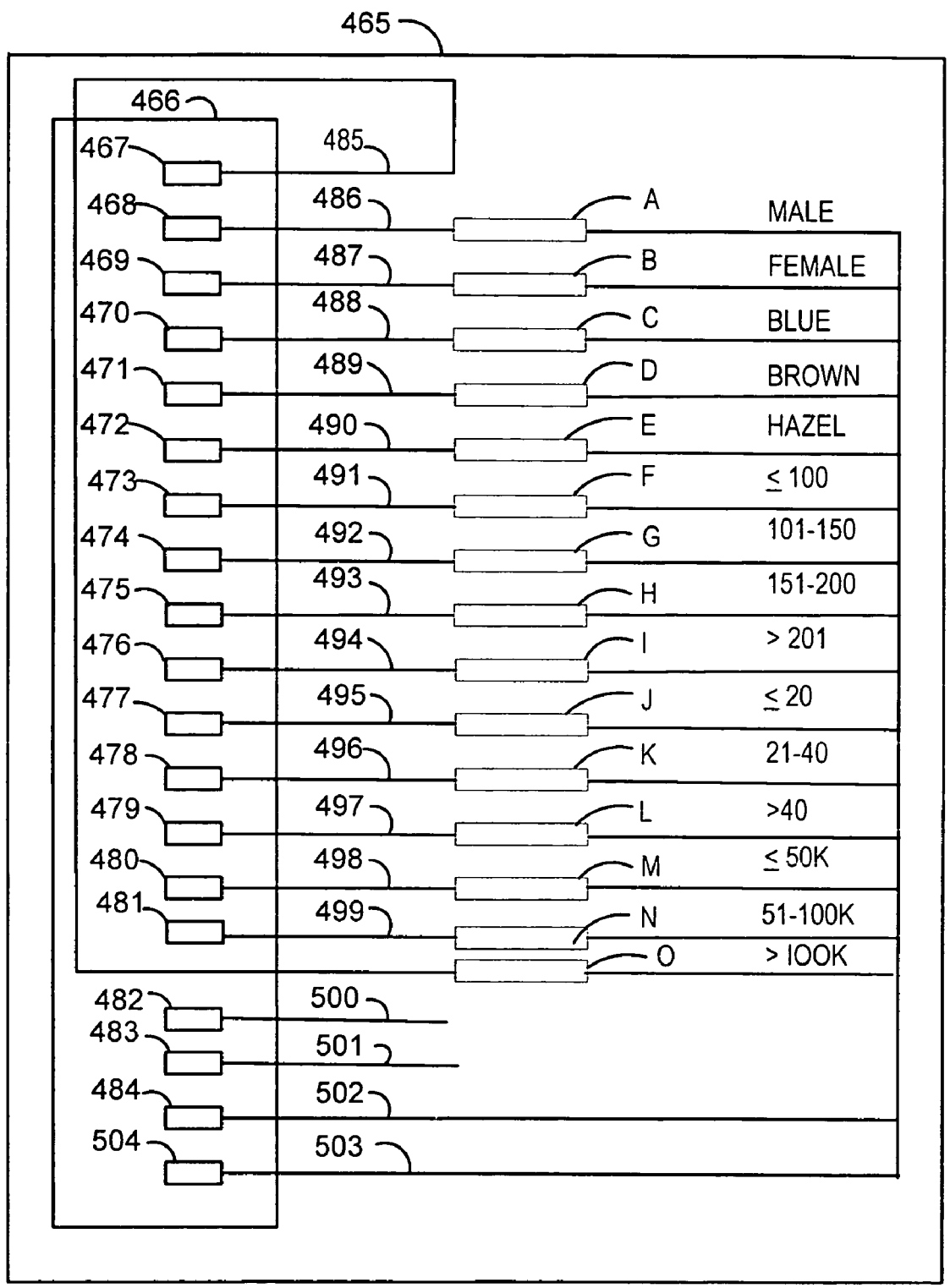
FIG. 7 is a drawing modifying the circuit of FIG. 5 to permits a user to answer the various questions posed in FIG. 5 in the same order.

FIG. 7 is a drawing modifying the circuit of FIG. 5 to permits a user to answer the various questions posed in FIG. 5 in the same order. Lines 500, 501 and 502 will indicate the order of the questions listed on paper 465. For instance, line 500 may represent $2^0$ and line 501 represents $2^1$. Line 502 would represent $2^2$. Line 502 is printed with a standard computer printer. Line 502 is connected to line 503. Hence, the questions listed in paper 465 are in the order indicated by identification 4. To the user i.e., the person answering the questions the order of the questions in identification 4 is the same order as order of the questions in identification 1. However, when a RFID reader reads the answers that the user indicated by using a graphite pencil or ballpoint pen to fill in one or more rectangles A-O, the answers to the questions would depend upon the connection of rectangles A-O to contacts 467-481. Hence, if someone is receiving to the answers to the questions being transmitted to the RFID reader they would be unable to ascertain what the answers to particular questions are since the answers to the questions will be transmitted by different contacts.

Rectangle "A" appears on line 486, which is connected to contact 468 and rectangle "B" appears on line 487, which is connected to contact 469. Rectangle "C" appears on line 488, which is connected to contact 470 and rectangle "D" appears on line 489, which is connected to contact 471.

Rectangle "E" appears on line 490, which is connected to contact 472 and rectangle F is connected to line 491 which is connected to contact 473. Rectangle "G" appears on line 492, which is connected to contact 474 and rectangle "H" appears on line 493, which is connected to contact 475. Rectangle "I" appears on line 494, which is connected to contact 476 and rectangle "J" appears on line 495, which is connected to contact 477. Rectangle "K" appears on line 496, which is connected to contact 478 and rectangle "L" is connected to line 497 which is connected to contact 479. Rectangle "M" appears on line 498, which is connected to contact 480 and rectangle "N" appears on line 499, which is connected to contact 481. Rectangle "O" appears on line 485, which is connected to contact 467.

Figure 8:
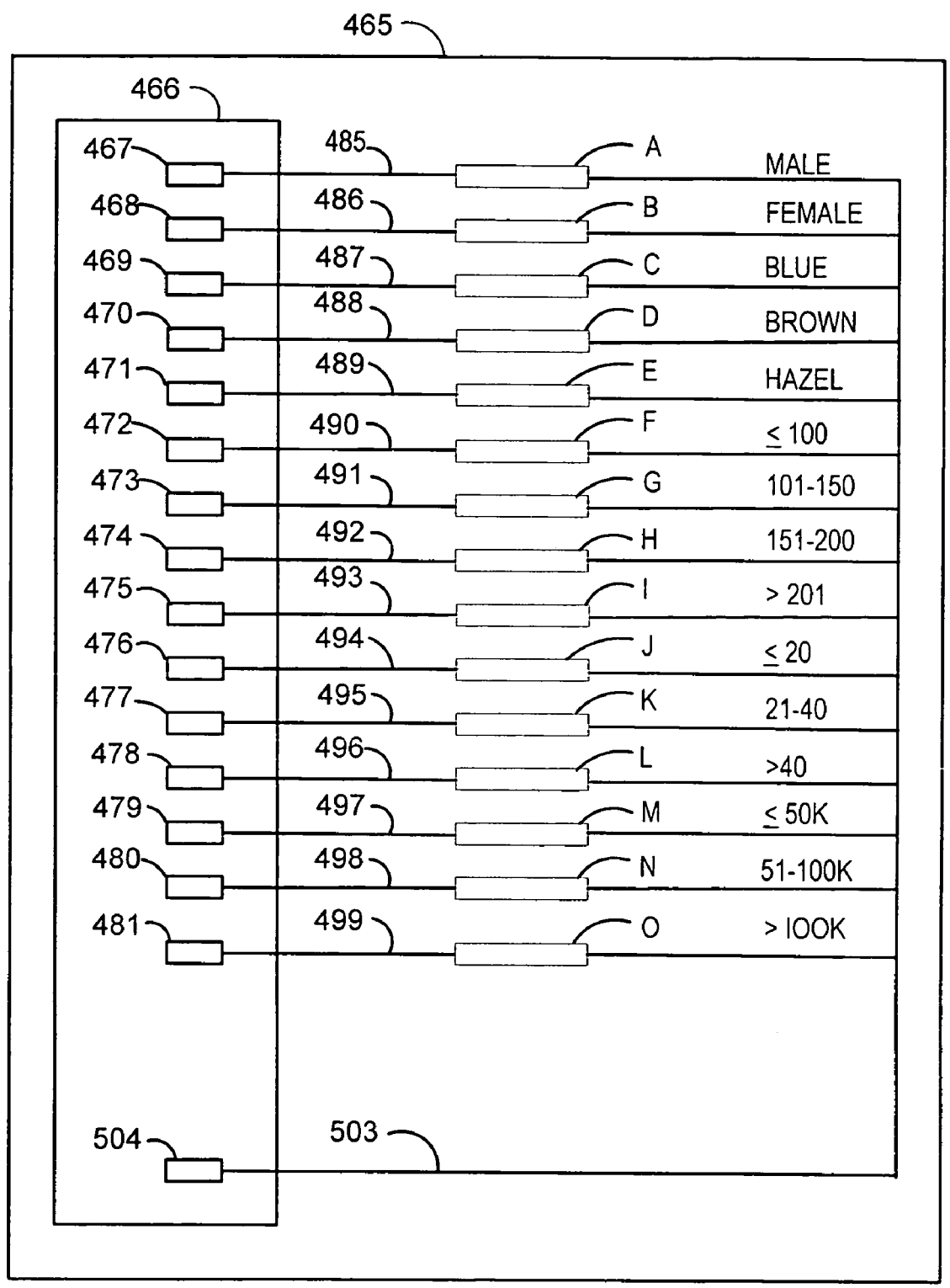
FIG. 8 is a drawing modifying the circuit of FIG. 5 by deleting lines 500, 501 and 502 and contacts 482, 483 and 484 so that the order of the questions in paper 465 and the lines and contacts connections will be determined by what is stored in memory 21 of FIG. 1.

FIG. 8 is a drawing modifying the circuit of FIG. 5 by deleting lines 500, 501 and 502 and contacts 482, 483 and 484 so that the order of the questions in paper 465 and lines and contacts connections will be determined by what is stored in the non volatile portion of memory 21 of FIG. 1. The questions listed in paper 465 are in the order shown in FIG. 5 and FIG. 8 and may be identified as identification number 1, which will be stored in the non-volatile portion of memory 21. It would be obvious to one skilled in the art that the identification number may be changed for different question orders.

Figure 9:
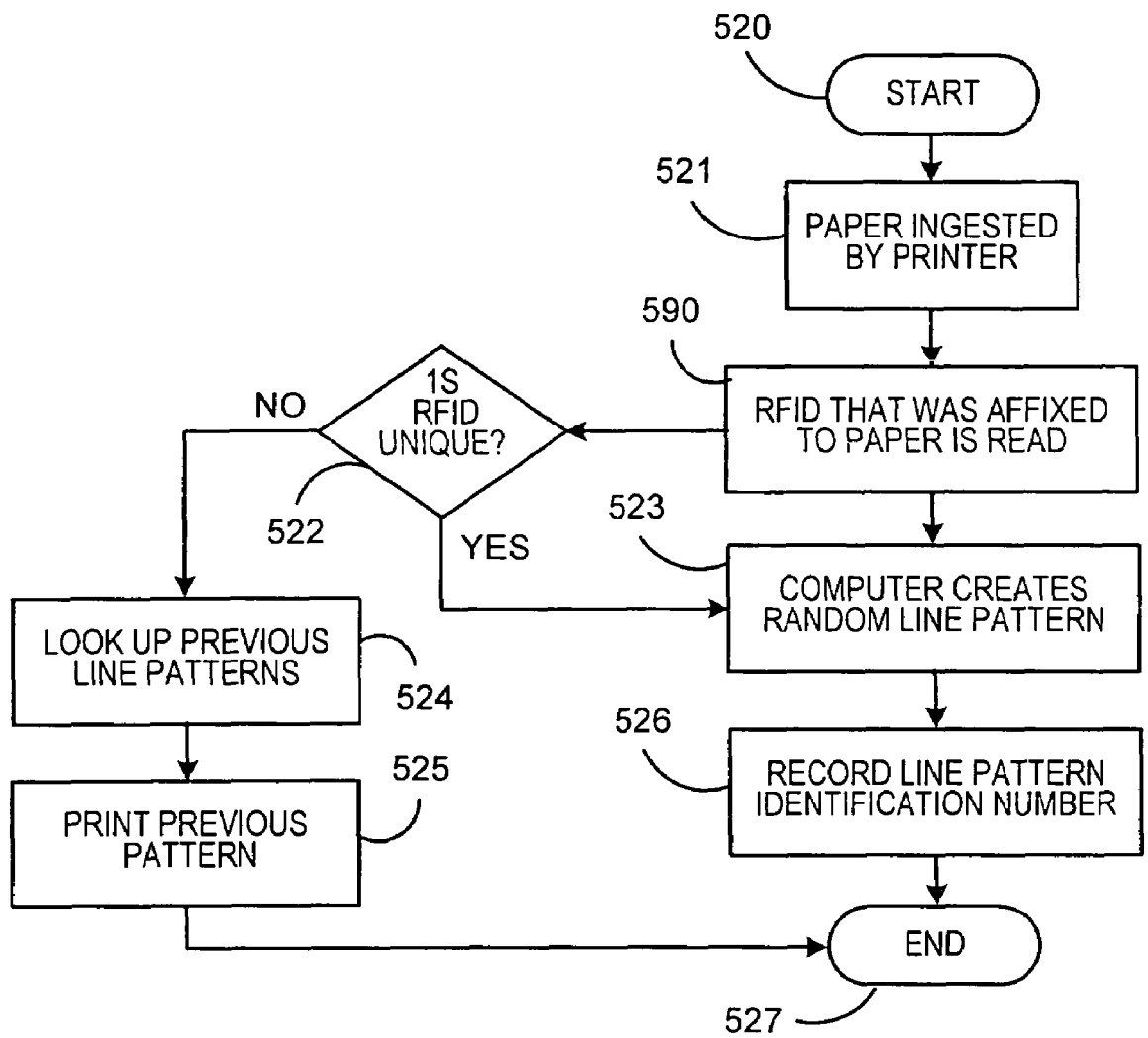
FIG. 9 is a flow chart that illustrates the manner in which the lines of FIG. 8 may be constructed.

FIG. 9 is a flow chart that illustrates the manner in which the lines of FIG. 8 may be constructed. The program begins in block 520. Then the program goes to block 521 where the material, i.e., paper is ingested by a ink jet printer. Now the program goes to block 590 where the identification number stored in the memory of RFID circuit 466 that was affixed to material 455 is read by RFID reader 11. At this point the program goes to decision block 522. Block 522 determines whether or not the identification number is unique, i.e., has not been used before. If block 522 determines that the identification number is unique, the program goes to block 523 where the computer causes a printer to print lines randomly connecting rectangles A-O to contacts 467-481 (FIG. 7 on material 465. Then the program goes to block 526 where the line pattern and the identification number are recorded in the memory of a computer. If block 522 determines that the identification number is not unique, the program goes to block 524 where the computer looks up previous line patterns that were not printed on material 465. Then the program goes to block 525 to print one of the line patterns that has not been printed. Now the program goes to block 527 and ends.

Figure 10:
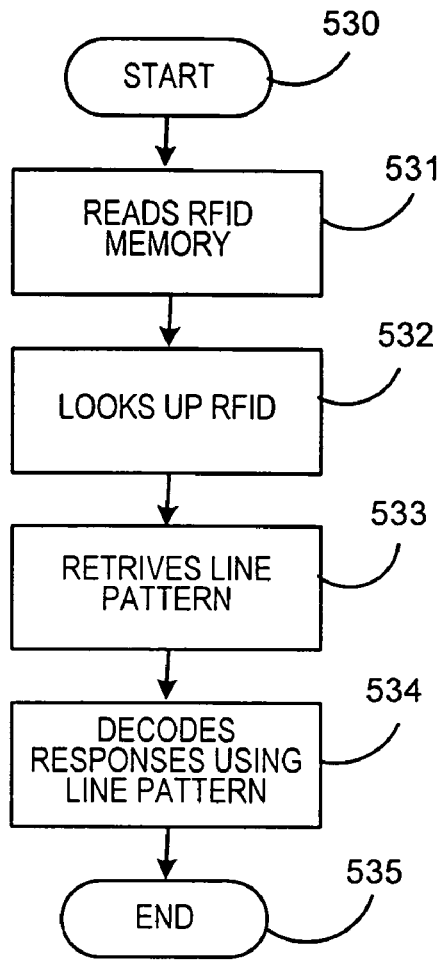
FIG. 10 a flow chart that illustrates how the lines of FIG. 9 are read.

FIG. 10 a flow chart that illustrates how the lines of FIG. 9 are read. The program begins in block 530. Then the program goes to block 531 where the RFID memory is read. Now the program goes to block 532 where the identification number is looked up in a database contained within the computer. Then the program goes to block 533 where the line pattern is retrieved. Now the program goes to block 534 where the responses are decoded using the line pattern. Then the program ends in block 535.

Figure 11:
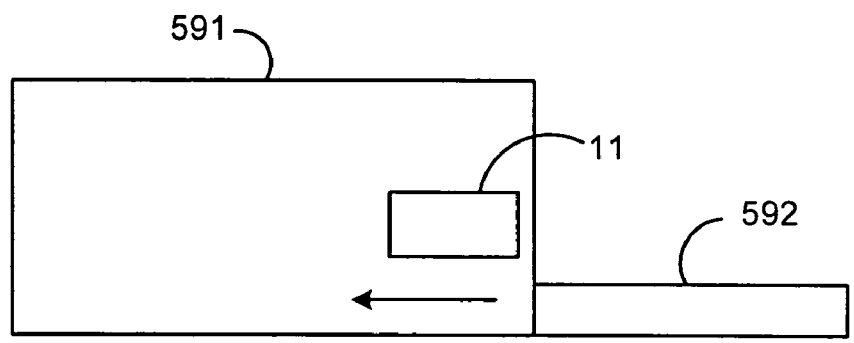
FIG. 11 is a cross sectional view of a laser line printer.

FIG. 11 is a cross sectional view of laser line printer 591, which has a tray 592. Printer 591 may be the Laser Jet 2200 manufactured by Hewlett Packard that has been modified to include a RFID reader 11. As printer 591 ingests paper with RFID circuit 466 affixed thereto, RFID reader 11 reads the identification number contained in RFID circuit 466.

The above specification describes a new and improved method for the secure reading of answers to questions or queries by an RFID reader that were made by marking answers with a pencil or ball point pen on a material. It is realized that the above description may indicate to those skilled in the art additional ways in which the principles of this invention may be used without departing from the spirit. Therefore, it is intended that this invention be limited only by the scope of the appended claims.

What is claimed is:

1. A method for a user to answer questions or queries, which comprises the steps of:
    A) coupling a radio frequency identification circuit to a material;
    B) placing electrical contacts that are at or near one of the edges of a material;
    C) placing an identification on the material;
    D) placing a conductor on the material; in a manner that is unique to each material identification; and
    E) applying by the user drawn lines with a pencil or black ball point pen on the material in a manner that the drawn lines will connect one or more contacts to the conductor and the radio frequency identification circuit so that the contacts will indicate depending on the identification the answers to questions or queries that have been proposed to the user.

2. The method claimed in claim 1, further including the step of: transmitting the answers to the questions to a reader.

3. The method claimed in claim 1, wherein the pencil is a graphite pencil.

4. The method claimed in claim 1, further including the step of:
    erasing one or more of the drawn lines to change the answers to the questions or queries.

5. The method claimed in claim 1, further including the step of:
    erasing the drawn lines with a eraser.

6. The method claimed in claim 1, wherein the material is paper.

7. The method claimed in claim 1, wherein the material is cardboard.

8. The method claimed in claim 1, wherein the material is a cellulose type product.

9. The method claimed in claim 1, wherein the material is plastic.

10. The method claimed in claim 1, wherein the electrical contacts are placed on the material with a ink jet printer.

11. The method claimed in claim 1, wherein the conductor is placed on the material with a ink jet printer.

12. The method claimed in claim 1, wherein the identification is one or more printed lines that connect one or more contacts to the conductor and the radio frequency identification circuit.

13. The method claimed in claim 12, wherein the printed lines are printed with a ink jet printer.

14. The method claimed in claim 12, wherein the identification represents a number.

15. The method claimed in claim 12, wherein the identification represents one or more alphanumeric characters.

16. A method for a user to answer questions or queries, which comprises the steps of:
    A) coupling a radio frequency identification circuit having a unique identification number to a material;
    B) placing electrical contacts that are at or near one of the edges of a material;
    C) placing a conductor on the material; in a manner that is unique to each material identification; and
    D) applying by the user drawn lines with a pencil or black ball point pen on the material in a manner that the drawn lines will connect one or more contacts to the conductor and the radio frequency identification circuit so that the contacts will indicate depending on the identification the answers to questions or queries that have been proposed to the user.

17. The method claimed in claim 16, further including the step of: transmitting the answers to the questions to a reader.

18. The method claimed in claim 16, wherein the pencil is a graphite pencil.

19. The method claimed in claim 16, further including the step of:
erasing one or more of the drawn lines to change the answers to the questions or queries.

20. The method claimed in claim 16, further including the step of:
erasing the drawn lines with a eraser.

21. The method claimed in claim 16, wherein the material is paper.

22. The method claimed in claim 16, wherein the material is cardboard.

23. The method claimed in claim 16, wherein the material is a cellulose type product.

24. The method claimed in claim 16, wherein the material is plastic.

25. The method claimed in claim 16, wherein the electrical contacts are placed on the material with a ink jet printer.

26. The method claimed in claim 16, wherein the conductor is placed on the material with a ink jet printer.

* * * * *